United States Patent [19]

Hoeptner, III

[11] Patent Number: 4,474,059

[45] Date of Patent: Oct. 2, 1984

[54] VALVE ADJUSTING TOOL

[76] Inventor: Herbert W. Hoeptner, III, 273 Hermosa, San Luis Obispo, Calif. 93401

[21] Appl. No.: 465,770

[22] Filed: Feb. 11, 1983

[51] Int. Cl.³ .......................................... G01M 15/00
[52] U.S. Cl. .................................. 73/119 R; 81/418; 81/425 R
[58] Field of Search ............... 73/119 R; 81/418, 420, 81/421, 425 R

[56] References Cited

U.S. PATENT DOCUMENTS

| 418,742 | 1/1890 | McFeely | 81/425 R |
|---|---|---|---|
| 2,851,782 | 9/1958 | Kollmann | 73/119 R |
| 3,585,704 | 6/1971 | Schroeder | 81/418 X |
| 4,386,542 | 6/1983 | Verna | 81/420 |

Primary Examiner—Jerry W. Myracle
Assistant Examiner—Ellwood G. Harding
Attorney, Agent, or Firm—William W. Haefliger

[57] ABSTRACT

An adjusting tool is easily usable on valve stem pusher structure to enable gap indication and adjustment. A socket grips a nut associated with that structure; a gripper locks the socket on the nut; and an indicator on the gripper indicates the gap dimension as the gripper is moved toward and away from the valve stem structure with the socket locked on the nut. The tool is also usable for other purposes.

11 Claims, 3 Drawing Figures

VALVE ADJUSTING TOOL

BACKGROUND OF THE INVENTION

This invention relates generally to indicating tools to indicate gap dimensions associated with poppet type valves. More particularly, it concerns an improved tool which enables gap indication, and also gap adjustment, requiring only two handed manipulations.

In the past, valve gap adjustment using feeler gauges has been difficult and time consuming due to the need for so-called "three-handed" manipulation; thus, insertion of the feeler gauge into the gap required the presence of a second mechanic, while the first mechanic used his two hands on the adjustment equipment; or a single mechanic had to lay down his adjuster while he manipulated the feeler gauge. Also, the use of feeler gauges can be extremely difficult.

SUMMARY OF THE INVENTION

It is a major object of the invention to obviate the above difficulties and problems, and to provide equipment to indicate and adjust such gaps, the use of which requires only two hands, so that only one user or mechanic is required. Basically, the indicator tool is adapted for use with an engine or other poppet valve assembly that includes an adjustable gap between valve stem structure and valve stem pusher structure, the assembly including a nut tightenable to lock the pushing structure in adjusted position. The tool then includes:

(a) a socket receivable about the nut,
(b) a gripper carrying the socket and operable to lock the socket on the nut, and
(c) an indicator on the gripper and engageable with said valve stem structure to indicate the gap dimension as the gripper is moved toward and away from the valve stem structure with the socket locked on the nut.

In its gap adjustment mode, the gripper is rotatably manipulable to loosen the nut to permit adjustment rotation of a threaded stem by second handed manipulation, for increasing or decreasing the gap dimension, as will appear.

These and other objects and advantages of the invention, as well as the details of an illustrative embodiment, will be more fully understood from the following specification and drawings, in which:

DRAWING DESCRIPTION

FIG. 1 is a side elevation showing an adjuster incorporating the invention;
FIG. 2 is a plan view on lines 2—2 of FIG. 1; and
FIG. 3 is a side elevation showing the adjuster in use.

DETAILED DESCRIPTION

Figure 1:
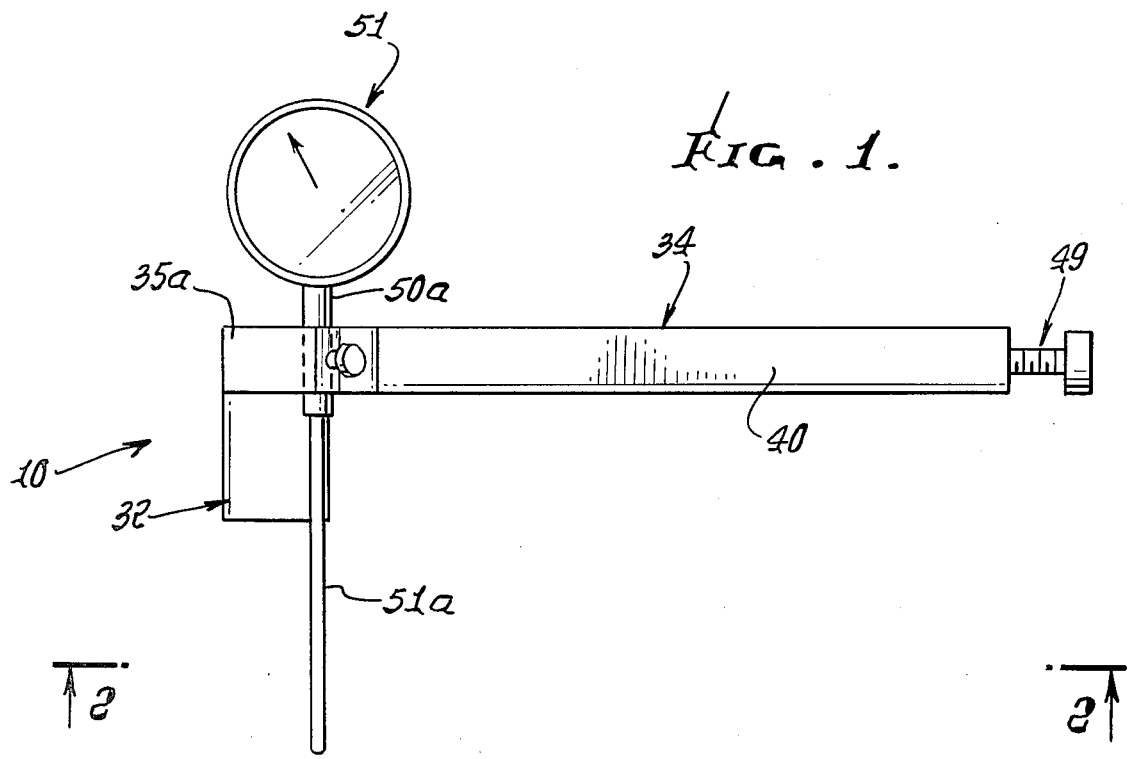
Figure 2:
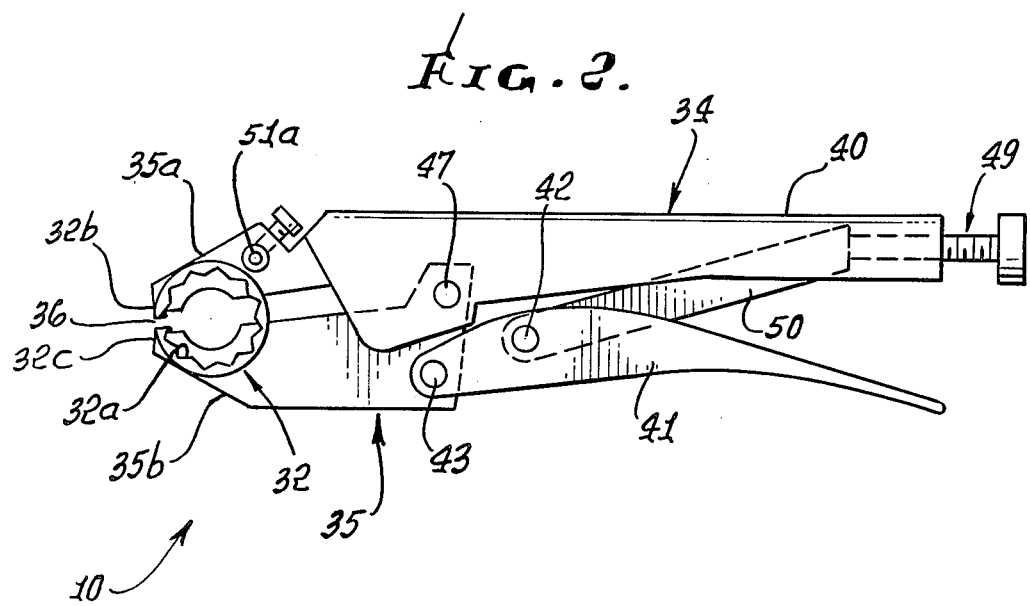
Figure 3:
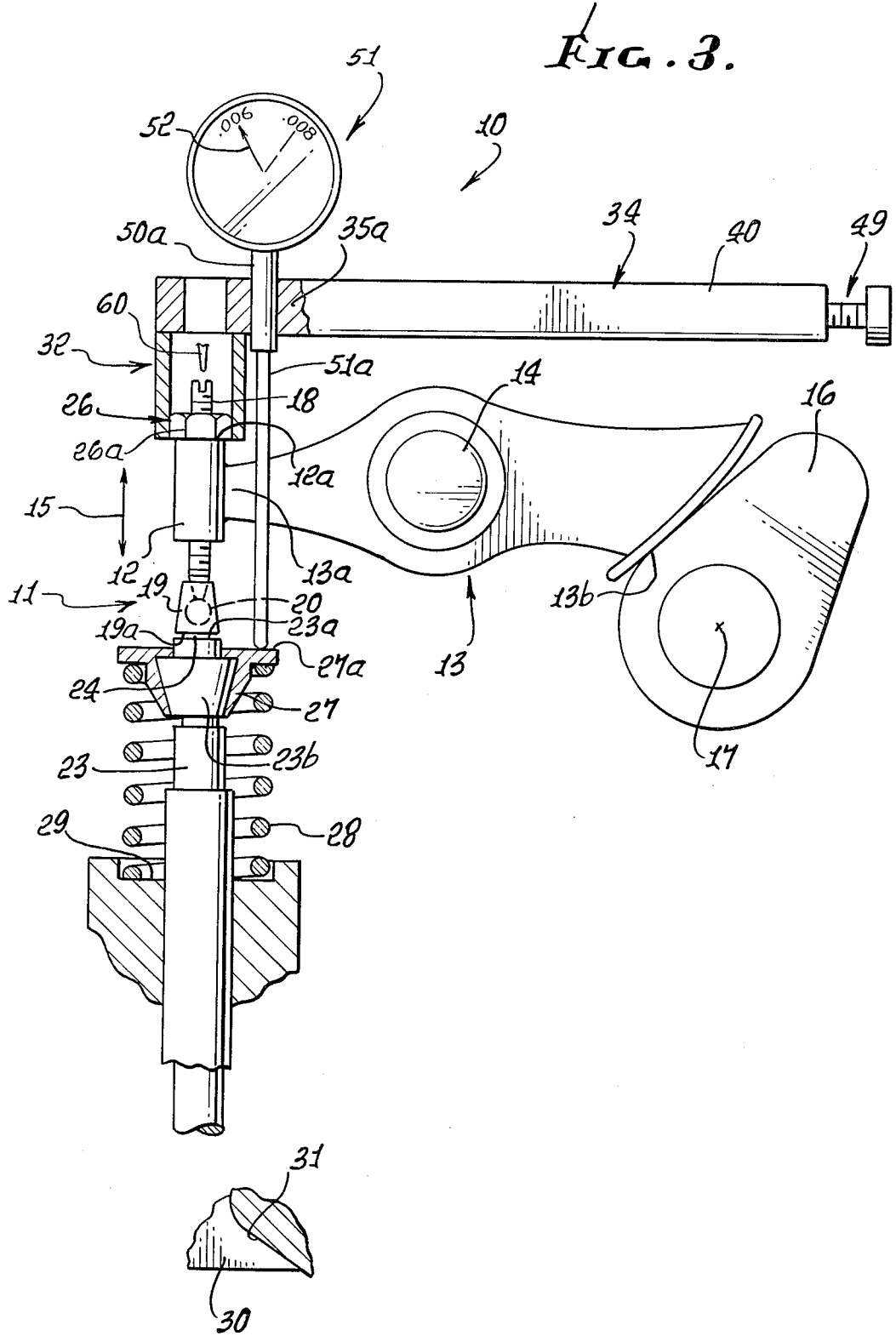

In FIGS. 1-3, the adjuster 10 is intended for adjusting an engine valve (or other valve) assembly 11. The latter for example includes a sleeve 12 carried at one end 13a of a rocker arm 13 pivotally supported at 14. The sleeve moves up and down (see arrows 15) in response to rocking of arm 13, typically effected by rotation of a cam 16 against arm follower surface 13b. The cam is rotated about axis 17, as by the engine output shaft (not shown).

A threaded stem 18 is threadably rotatable in the sleeve, and a part 19 is carried by the stem, as for example via a ball and socket connection indicated at 20, allowing parallel face orientation of the under face 19a of part 19 and top face 23a of valve stem 23 (or upper extension thereof). A gap or space 24 is formed between such faces, at an up-position of the sleeve 12, as shown, and it is the purpose of the invention to facilitate easy, quick and accurate adjustment of the gap dimension or spacing. (As for example by the user's two-handed manipulation of the adjuster tool 10 and threaded stem 18.

Also shown in FIG. 3 are a nut 26 on the threaded stem, tightenable against the upper end of sleeve 12 to fix the position of the stem 18 relative to the sleeve 12, (which also fixes the gap dimension). A spring retainer flange 27 is carried on the upper end portion 23b of the valve 23, and a compression spring 28 is retained between that flange and engine body surface 29. In the closed position of the valve head 30, the retainer is urged upwardly by the spring to the position shown. As the rocker arm pivots counterclockwise, the sleeve 12, stem 18, and part 19 are displaced downwardly to close gap 24, causing depression of the valve stem 23 and retainer 27, to open valve head 30 relative to seat 31.

In accordance with the invention, the adjuster 10 includes a socket 32 applicable or receivable about the nut 26 as shown. The socket may be interiorly serrated as at 32a, to firmly receive the nut exterior corners 26a. Also, the socket is preferably split, endwise to have C-shape, so as to loosely fit endwise over the nut prior to clamping to the nut. The adjuster also includes a hand operable gripper 34 having a body 35 including jaws 35a and 35b. The portions 32b and 32c of the socket closest the split 36 are attached as by welding to the jaw tips, whereby as the jaws are moved relatively toward and away from one another, the socket nut receiving cross dimension as reduced or expanded, respectively.

The gripper also has arms 40 and 41, pivotably interconnected as at 42. The arms may have over-center connection to lockably clamp the socket to the nut, as arm 41 is closed toward arm 40. For this purpose, note pivot 43 between arm 41 and jaw 35b and pivot 47 between arm 40 and jaw 35b. Jaw 35a is affixed to one end of arm 40. An adjustment screw 49 adjusts the position of pivot 42, via slide 50, as is conventional.

An indicator (as at 51 for example) is provided on the jaw 35a of the body 35. The indicator projects (as for example is represented by dial indicator plunger 51a) below that jaw in FIGS. 1 and 3, to engage the top surface 27a of the retainer flange 27, in response to downward reception of the socket about the nut. Thus, the indicator is adapted to indicate changes in gap dimension as the gripper and the gripped nut as well as the stem 18 and part 19 are moved up and down relative to retainer 27, by one-handed manipulation of the gripper.

FIG. 3 shows the dial indicator needle 52 deflected to a first position (say, 0.006 inches for example) as the plunger 51a is deflected relative to the indicator body 50a attached to jaw 35a. The socket may now be clamped on the nut which is tightened onto sleeve end 12a to fix the stem 18 relative to the sleeve. The tool is then movable up and down (rocking the rocker arm 13) to cause the needle to move between two limits, i.e. a down-limit corresponding to closing of the gap to zero and engagement of faces 19a and 23a, and an up-limit corresponding to engagement of rocker arm surface 13b with the cam 16. If the thus indicated gap width (as indicated by the difference between two corresponding needle positions on the indicator dial) is not correct, the tool may be rotated to loosen the nut. The stem 18 may then be turned in the sleeve 12 to which it is threaded (as by a screw driver tip 60 manipulated by the user's other or second hand) to an extent corresponding to estimated correct gap width. The nut is then tightened by rotation of the tool and the up and down movement of the tool repeated to again establish two needed positions indicating adjusted gap width. This procedure is repeated (using two hands only) until the correct gap width is established. Thereafter, nut 26 is tightened, the adjuster tool unlocked from the nut, and removed.

It will be noted that the tool is also characterizable as a gap indicator for use with an engine or other poppet valve assembly that includes an adjustable gap between valve stem structure and valve stem pusher structure, the assembly including a nut tighteneable to lock the pushing structure. In this sense, the tool includes
  (a) a socket receivable about the nut,
  (b) a gripper carrying the socket and operable to lock the socket on the nut, and
  (c) an indicator on the gripper and engageable with said valve stem structure to indicate the gap dimension as the gripper is moved toward and away from the valve stem structure with the socket locked on the nut.

I claim:

1. In an adjuster for adjusting an engine or other poppet valve assembly including:
  (a) a rocker arm carried sleeve,
  (b) a threaded stem rotatable in the sleeve and a part carried by the stem to engage a valve stem end, there being an adjustable gap between said part and said valve stem end, and there being a spring retainer associated with the valve stem, and
  (c) a nut on the threaded stem to be loosened relative to said sleeve when the threaded stem is to be rotated to adjust said gap, the adjuster including
  (d) a socket to be received about the nut,
  (e) a hand operated gripper carrying the socket and operable to cause the socket to grip the nut, the gripper having a body,
  (f) an indicator on said body and projecting to engage said retainer in response to said socket reception about the nut, and to indicate changes in gap dimension as the gripper and the gripped nut as well as said threaded stem and part are moved toward and away from said retainer by one-handed manipulation of the gripper,
  (g) the gripper also being rotatably manipulable to loosen the nut as referred to, thereby to permit said rotation of the threaded stem by second-handed manipulation, for increasing or decreasing said gap to desired extent as measured by said indicator,
  (h) the socket having C-shape with only one split, the socket also having a serrated bore, to be contracted about the nut by the gripper.

2. The adjuster 1 wherein the gripper has jaws carrying said socket, and the gripper has pivotally connected arms which are hand manipulable.

3. The adjuster of claim 2 wherein said arms have over-center connection to lockably clamp the socket to the nut.

4. The adjuster of claim 1 wherein the indicator includes plunger projecting to engage said retainer, and a dial mechanism operable by said plunger.

5. The adjuster of claim 2 wherein the socket defines a split, the two portions of the socket closest to the split being attached to the two jaws, respectively.

6. The tool of claim 1 wherein the gripper has jaws carrying said socket, and the gripper has pivotally connected arms which are hand manipulable.

7. The tool of claim 6, the two portions of the socket closest to the split being attached to the two jaws, respectively.

8. A gap indicating tool for use with an engine or other poppet valve assembly that includes an adjustable gap between valve stem structure and valve stem pushing structure, said assembly including a nut tightenable to lock said pushing structure, said tool including,
  (a) a socket receivable about the nut,
  (b) a gripper carrying the socket and operable to lock the socket on the nut, and
  (c) an indicator on the gripper and engageable with said valve stem structure to indicate the gap dimension as the gripper is moved toward and away from the valve stem structure with the socket locked on the nut,
  (d) the socket having C-shape with only one split, the socket also having a serrated bore, to be contracted about the nut by the gripper.

9. The tool of claim 8 wherein the indicator is a dial indicator unit having a spring urged plunger engageable with said valve stem structure, and a body carried by a jaw defined by the gripper.

10. An adjusting tool comprising
  (a) a pliers having pivoted levers defining jaws, the levers elongated generally longitudinally, and
  (b) a split gripper socket projecting laterally relative to the jaws and connected to the jaws to expand and contract as the jaws are moved relatively away from and toward one another,
  (c) the socket having C-shape with only one split, the socket also having a serrated bore, whereby the socket may be contracted about a nut as the jaws are contracted.

11. The tool of claim 10 wherein the socket has terminals proximate the split and respectively connected to the jaws.

* * * * *